(12) United States Patent
Few

(10) Patent No.: US 6,905,130 B2
(45) Date of Patent: Jun. 14, 2005

(54) TORSION AXLE

(75) Inventor: Jeffrey P. Few, Elkhart, IN (US)

(73) Assignee: Norco Industries, Inc., Elkhart, IN (US)

( * ) Notice: Subject to any disclaimer, the term of this patent is extended or adjusted under 35 U.S.C. 154(b) by 0 days.

(21) Appl. No.: 10/178,096

(22) Filed: Jun. 24, 2002

(65) Prior Publication Data

US 2004/0000769 A1 Jan. 1, 2004

(51) Int. Cl.$^7$ .................. B60G 3/04; B60G 11/23
(52) U.S. Cl. .................. 280/124.169; 280/124.166; 280/124.167; 280/86.757; 280/124.134
(58) Field of Search .................. 280/124.134, 124.137, 280/124.166, 124.167, 124.169, 86.757, FOR 152, FOR 174, 124.111, 124.13, 86.75, 86.751; 267/273, 274, 276, 277, 285, 279, 280–282

(56) References Cited

U.S. PATENT DOCUMENTS

| | | | |
|---|---|---|---|
| 1,373,331 A | | 3/1921 | Hupp |
| 1,919,033 A | * | 7/1933 | Noble .................. 267/274 |
| 1,941,673 A | | 1/1934 | Fink |
| 1,993,260 A | * | 3/1935 | Burns .................. 267/281 |
| 2,075,041 A | | 3/1937 | Kliesrath |
| 2,080,969 A | | 5/1937 | MacBeth |
| 2,115,915 A | * | 5/1938 | McCain .................. 280/86.757 |
| 2,148,029 A | | 2/1939 | Matthews |
| 2,188,952 A | * | 2/1940 | Leighton .................. 267/280 |
| 2,544,331 A | * | 3/1951 | Kogstrom .................. 280/86.754 |
| 2,684,845 A | * | 7/1954 | Moulton .................. 267/279 |
| 2,712,742 A | | 7/1955 | Neidhart |
| 2,715,022 A | * | 8/1955 | Krotz .................. 267/278 |
| 2,824,734 A | * | 2/1958 | Linn et al. .................. 267/281 |
| 2,858,142 A | | 10/1958 | Schjolin et al. |
| 2,861,796 A | * | 11/1958 | Rohr .................. 267/257 |
| 2,988,371 A | | 6/1961 | Allison |
| 2,998,241 A | | 8/1961 | Eyb |
| 3,006,627 A | * | 10/1961 | Paulsen .................. 267/280 |
| 3,243,007 A | | 3/1966 | Berckhan |
| 3,601,424 A | * | 8/1971 | Badland .................. 280/124.13 |
| 3,701,542 A | | 10/1972 | Grosseau |
| 3,770,291 A | | 11/1973 | Kramer |
| 3,779,576 A | * | 12/1973 | Malcolm .................. 280/684 |
| 3,831,966 A | | 8/1974 | Grosseau |
| 4,027,899 A | | 6/1977 | Hawes et al. |
| 4,291,895 A | | 9/1981 | Wohrle et al. |
| 4,540,197 A | | 9/1985 | Finn et al. |
| 4,635,958 A | | 1/1987 | Yonemoto |
| 4,695,073 A | * | 9/1987 | Pettibone et al. .................. 280/86.757 |
| 4,778,199 A | * | 10/1988 | Haggerty et al. .................. 280/124.102 |
| 4,781,364 A | | 11/1988 | Finn et al. |
| 4,848,789 A | | 7/1989 | Timoney et al. |
| 4,903,981 A | * | 2/1990 | Alesso et al. .................. 280/86.757 |
| 5,161,818 A | | 11/1992 | Kopieczek |
| 5,215,328 A | | 6/1993 | Bono et al. |
| 5,277,450 A | | 1/1994 | Henschen |
| 5,411,287 A | | 5/1995 | Henschen |
| 5,503,374 A | * | 4/1996 | Hellon .................. 267/281 |
| 5,709,605 A | | 1/1998 | Riefe et al. |
| 5,716,042 A | | 2/1998 | Derviller |
| 5,758,896 A | | 6/1998 | Cruise |
| 5,788,265 A | * | 8/1998 | McLaughlin .................. 280/124.169 |
| 5,810,338 A | | 9/1998 | Koenig et al. |
| 5,816,606 A | | 10/1998 | Cruise et al. |
| 5,921,568 A | | 7/1999 | Cruise et al. |
| 6,070,892 A | | 6/2000 | Noutomi et al. |
| 6,318,710 B1 | | 11/2001 | Anderson et al. |
| 6,588,778 B1 | * | 7/2003 | McLaughlin .................. 280/124.13 |

* cited by examiner

Primary Examiner—Ruth Ilan
(74) Attorney, Agent, or Firm—Hahn Loeser & Parks LLP; W. Edward Crooks, Esq.

(57) ABSTRACT

A linear or longitudinal torsion axle where the torsion shaft extends parallel to the longitudinal extent of the vehicle to which the torsion axle is attached. The torsion axle includes two torsion assemblies with the torsion shaft extending into and being supported by both torsion assemblies. Each torsion assembly has a housing enclosing a plurality of resilient torsion rods spaced about the outside of the torsion shaft. The torsion shaft is fixed to a wishbone connector that is positioned between the two torsion assemblies. A wheel spindle is fixed to an outer end of the wishbone connector to accept a wheel and tire assembly.

18 Claims, 11 Drawing Sheets

TORSION AXLE

BACKGROUND OF THE INVENTION

This invention relates generally to torsion axles and more particularly to linear or longitudinal torsion axles where the torsion axle extends in a longitudinal direction parallel to the direction of normal travel of a vehicle or trailer.

Typical torsion axles for trailers use a laterally extending axle tube that extends from one side of the trailer to the other. A single torsion shaft or two shorter torsion shafts are mounted in the axle tube with a resilient member or members surrounding the torsion shaft. See for example, U.S. Pat. No. 5,277,450 or U.S. Pat. No. 4,291,895.

Some disadvantages with typical torsion axles include: assembled axles, because of weight and size, must be shipped on flat bed trailers; typical torsion axle weight is more than 100 pounds. In addition, if the torsion axle breaks, it is normally necessary to replace the entire axle. Because the axle tube fits below the trailer floor and frame, ground clearance beneath the trailer is reduced. Sometimes, for boat trailers, the axle is bent to clear the bottom of the boat keel, reducing the ground clearance even further. As a result, to maintain necessary ground clearance, the center of gravity of a loaded trailer is increased.

The foregoing illustrates limitations known to exist in present torsion axles. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a torsion axle comprising: a shaft; at least one torsion assembly, the shaft extending into and being supported by the at least one torsion assembly; a connecting arm being fixed to the shaft; and a wheel spindle pivotally connected to an end of the connecting arm distal the shaft, the wheel spindle having an axis 90° to the axis of the shaft.

In a second aspect of the present invention, this is accomplished by providing a torsion axle for use with a vehicle, the vehicle having a longitudinal dimension extending from front to back and a transverse dimension extending from side to side, the torsion axle comprising: a longitudinally extending torsion shaft; at least one torsion assembly, the torsion shaft extending into and being supported by the at least one torsion assembly, the torsion assembly comprising: a housing adapted to be attached to the vehicle; and a plurality of longitudinally extending resilient rods within the housing, the resilient rods being spaced about an outer periphery of the torsion shaft, the torsion shaft being configured to engage the resilient rods whereby the resilient rods resist rotation of the torsion shaft.

In a third aspect of the present invention, this is accomplished by providing in a trailer having a floor and a plurality of sides, the trailer having a longitudinal dimension extending from front to back and a transverse dimension extending from side to side, a torsion axle comprising: a longitudinally extending torsion shaft; two spaced apart torsion assemblies; and a connecting arm positioned between the torsion assemblies, the torsion shaft being fixed to the connecting arm.

The foregoing and other aspects will become apparent from the following detailed description of the invention when considered in conjunction with the accompanying drawing figures.

DETAILED DESCRIPTION

Figure 1:
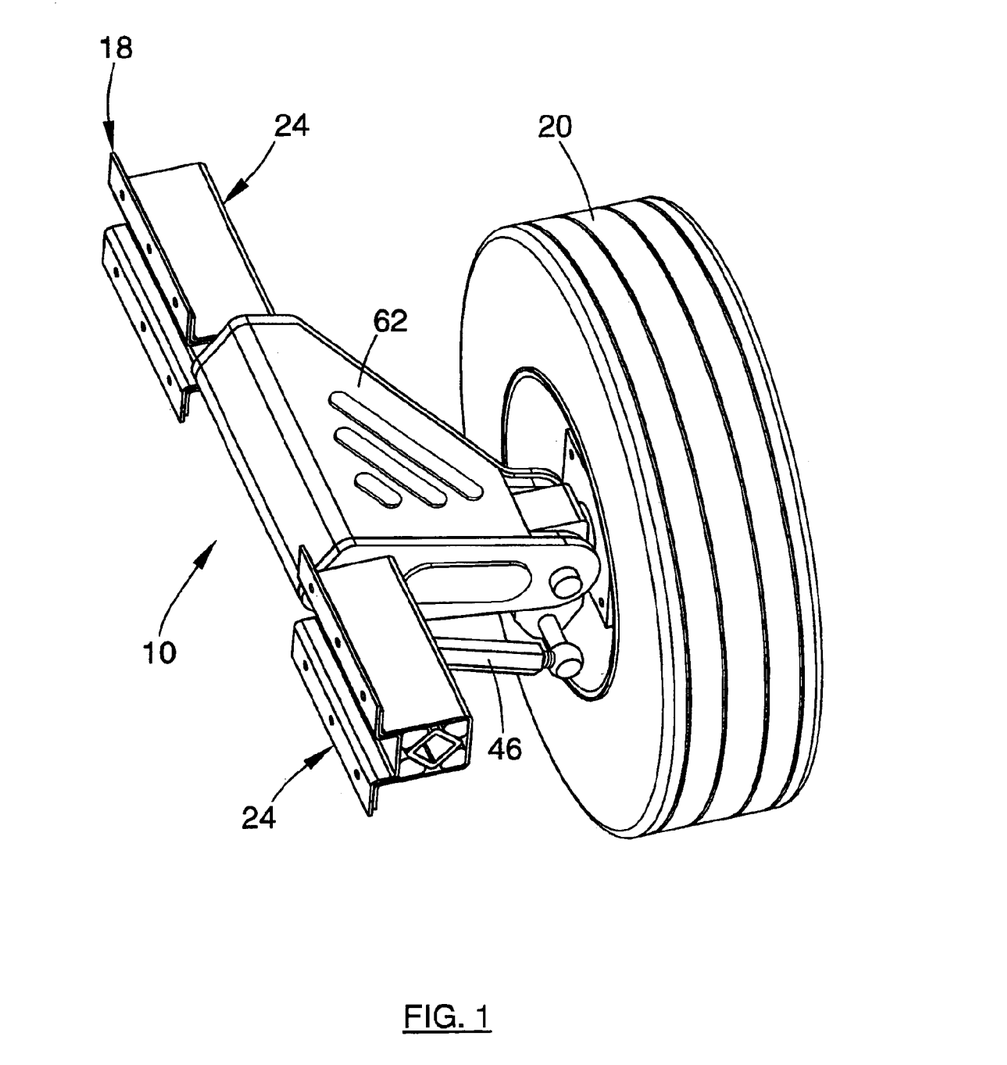
FIG. 1 is a first perspective view of a torsion axle according to the present invention, with a wheel and tire attached.

FIG. 1. shows a linear or longitudinal torsion axle 10 with a wheel and tire 20 attached to the torsion axle 10. One torsion axle 10 is provided for each wheel and tire 20. The torsion axle 10 includes a torsion shaft 36 (FIGS. 2–5) that extends parallel to the longitudinal dimension (i.e. along the direction of travel) of the vehicle or trailer to which the torsion axle 10 is attached.

Figure 2:
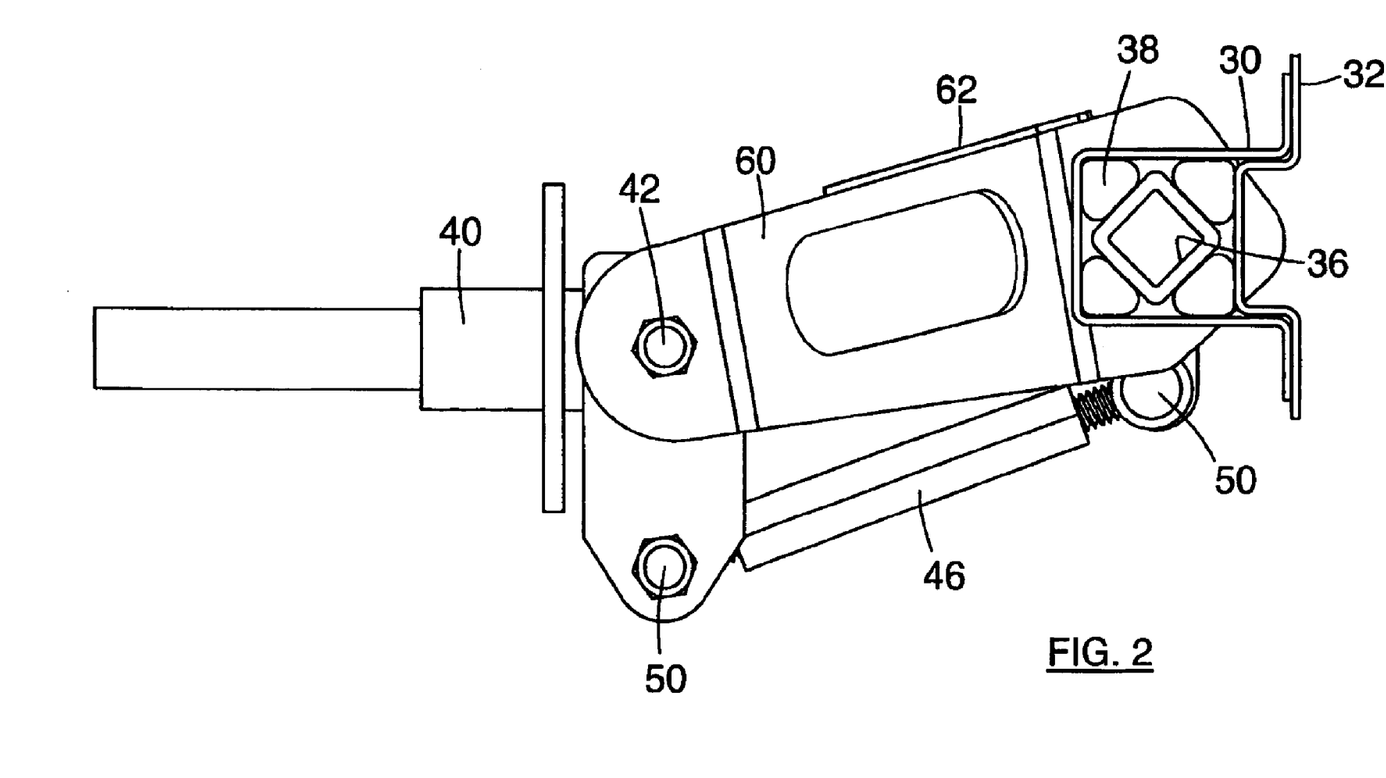
FIG. 2 is a side view of the torsion axle shown in FIG. 1.
Figure 3:
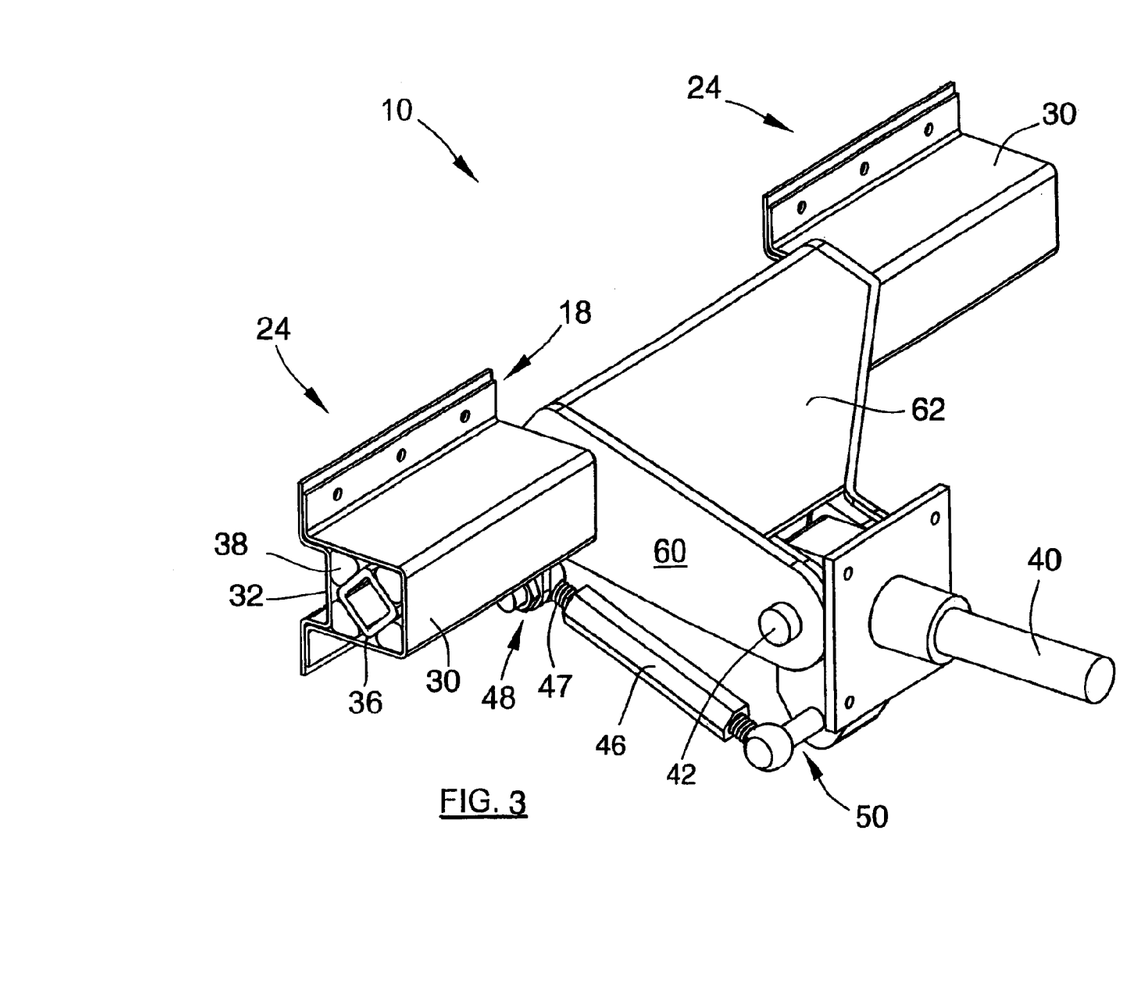
FIG. 3 is a perspective view of the torsion assembly shown in FIG. 1.
Figure 4:
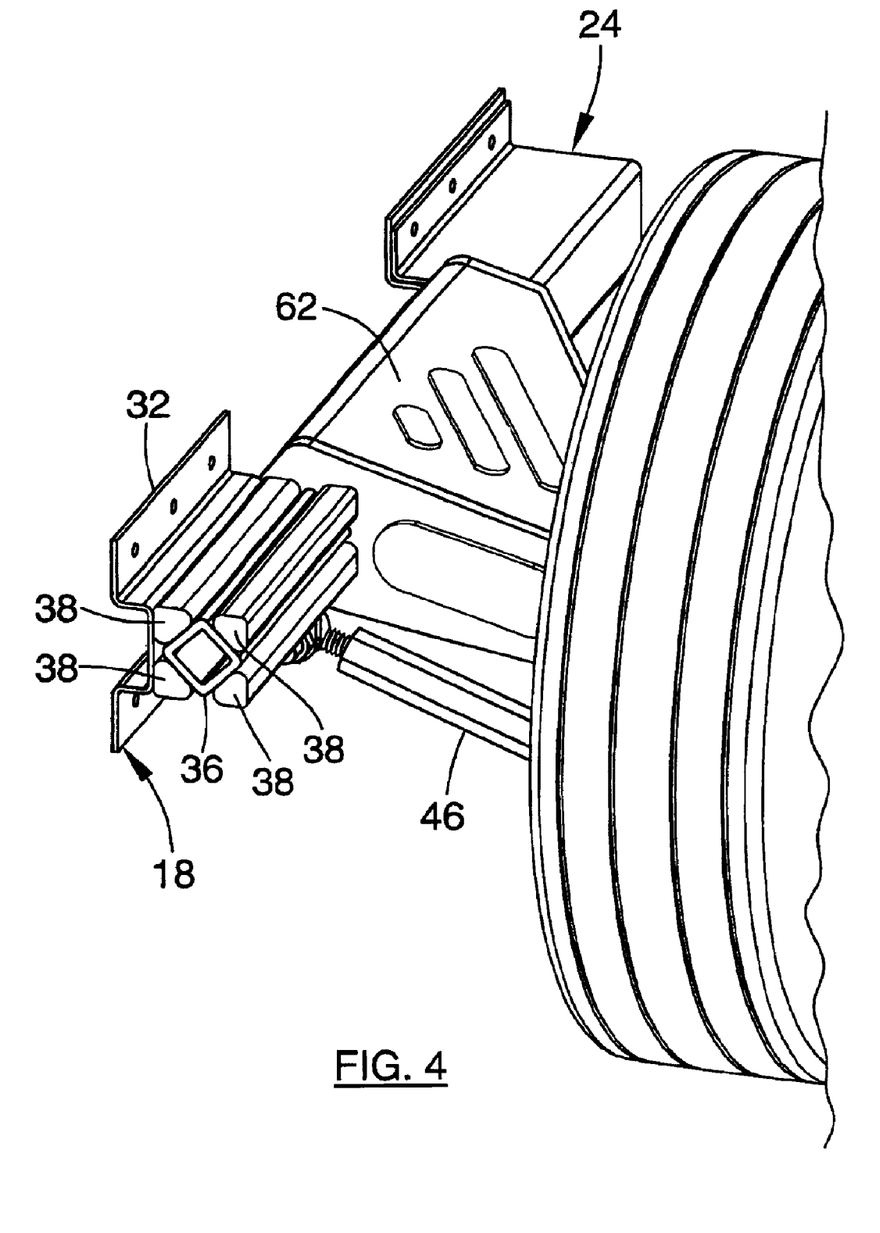
FIG. 4 is a perspective view of a the torsion assembly of FIG. 1, shown with torsion assembly housing removed.
Figure 12:
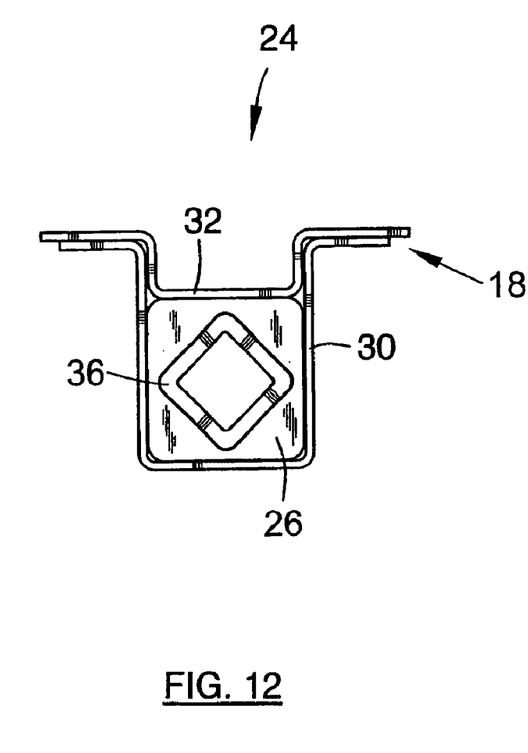
FIG. 12 is an end view of a further embodiment of a torsion assembly, shown with a resilient material surrounding the torsion shaft.

FIGS. 1–3 show the primary components of torsion axle 10. A tubular torsion shaft 36 is attached to a wishbone connecting arm 60. Although a tubular torsion shaft 36 is shown in the FIGS., a solid torsion shaft can also be used. The torsion shaft 36 extends into and is supported by two torsion assemblies 24. Each torsion assembly 24 includes a housing 30 with a plurality of longitudinally extending resilient rods 38 within housing 30 and spaced about the outside of torsion shaft 36. Resilient rods 38 are preferably formed from natural rubber, although other synthetic resilient materials can be used. In addition to using a plurality of resilient rods 38, torsion assembly 24 can be filled with a resilient material 26 (FIG. 12) surrounding and engaging torsion shaft 36. Torsion shaft 36 has a non-cylindrical shape configured to engage the resilient rods 38 that the resilient rods 38 resist rotation of the torsion shaft 36. Although torsion shaft 36 is shown with a square shape, other shapes such as triangular or multi-lobed shapes can be used. The resilience of the resilient rods 38 in one torsion assembly 24 can differ from the resilience of the resilient rods 38 in the other torsion assembly 24, such as by varying the durometer of the resilient rods 38. This would allow for additional tuning of the torsion assemblies to a particular application.

In a preferred embodiment, housing 30 includes a separate housing side 32 that partially nests within housing 30.

One method of assembling torsion assembly 24 is to place the torsion rods 38 and torsion shaft 36 into housing 30 in an uncompressed state and then press housing side 32 into housing 30 to provide a compression pre-load on resilient torsion rods 38. Housing side 32 is then fixed to housing 30 by welding, riveting or other appropriate methods. Housing 30 and housing side 32 include a mounting flange 18 used to attach torsion axle 10 to the trailer.

Figure 5:
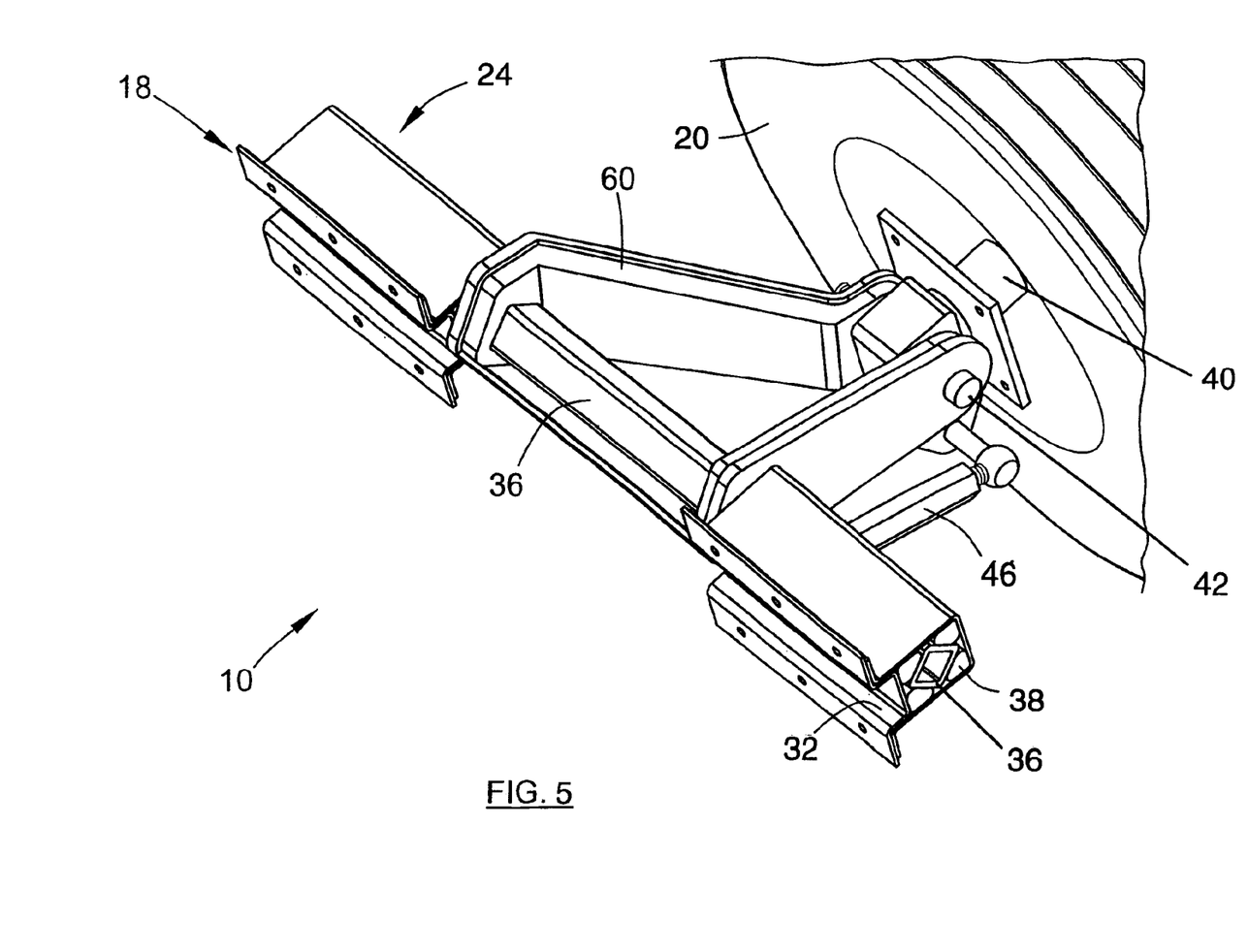
FIG. 5 is a perspective view of the torsion assembly shown in FIG. 1, shown with cover plate removed.
Figure 6:
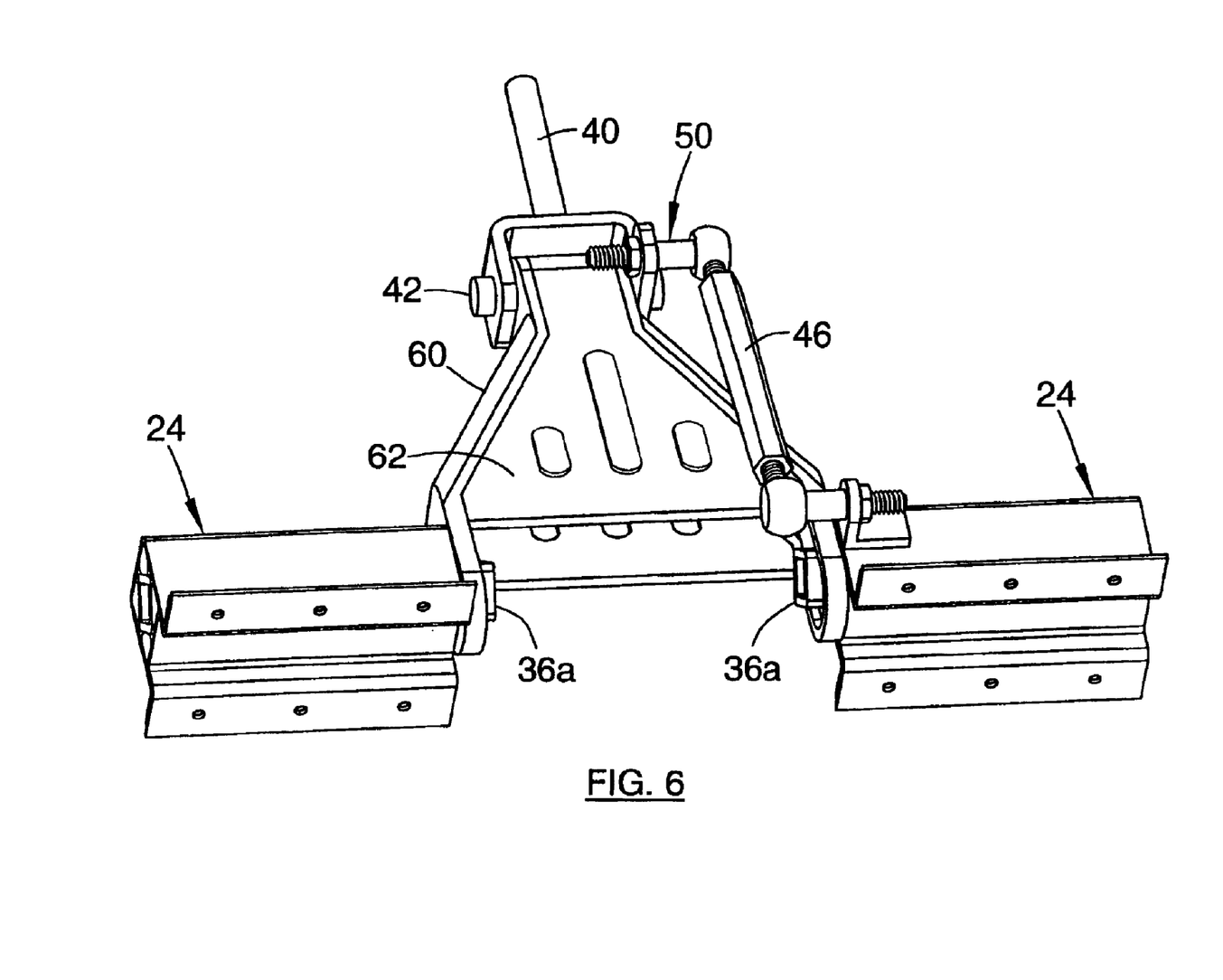
FIG. 6 is a perspective view of a embodiment of a torsion axle having two shaft sections.
Figure 10:
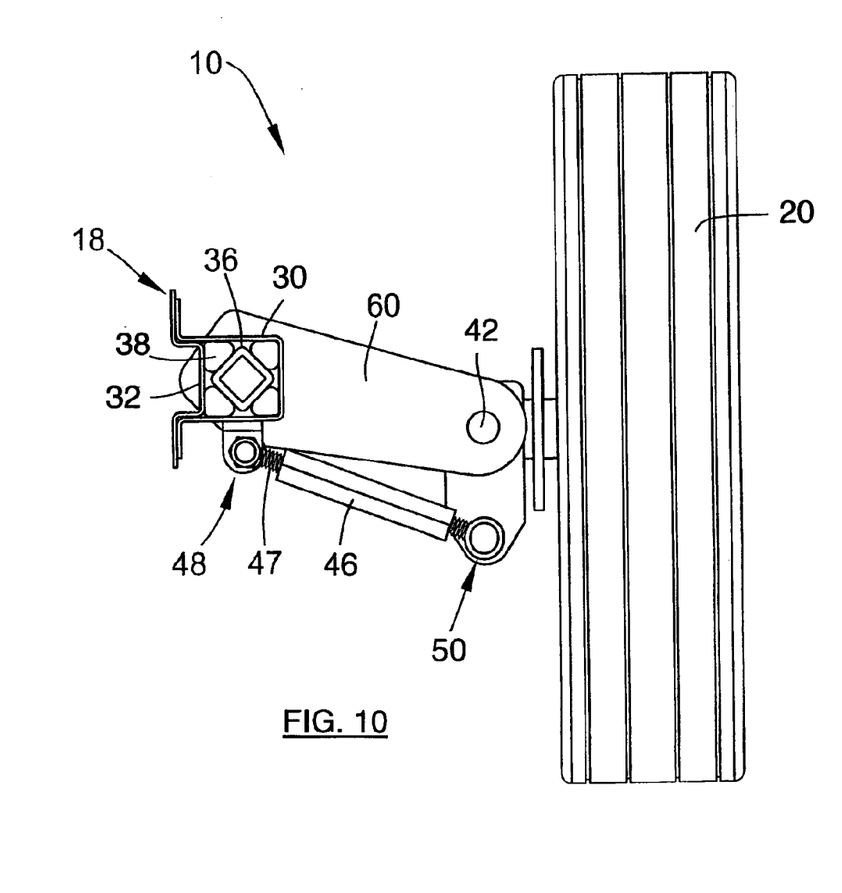
FIG. 10 is an end view of the torsion axle of FIG. 1, shown attached to a wheel and tire.
Figure 11:
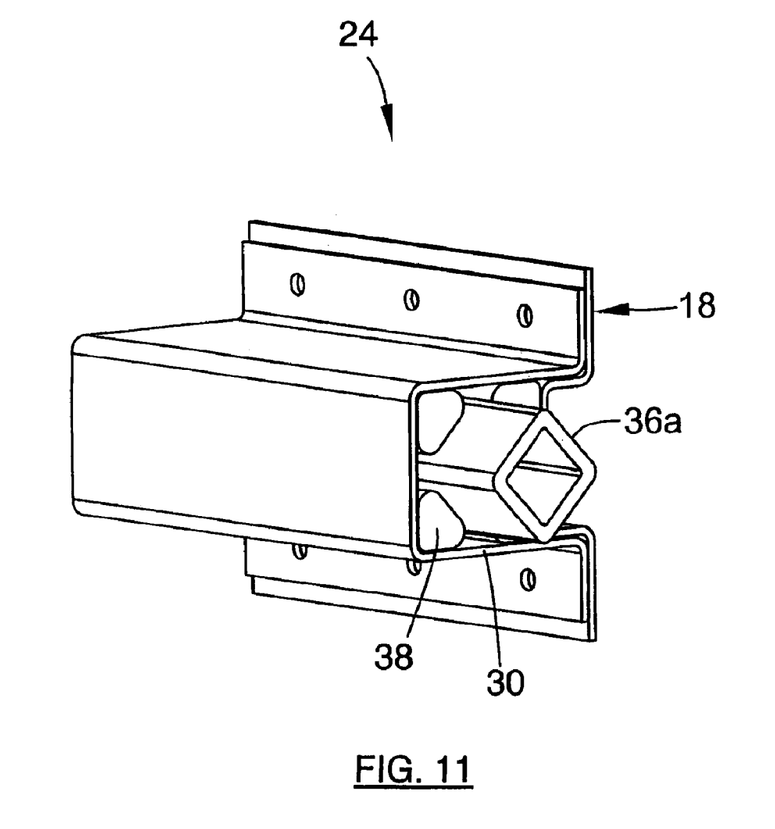
FIG. 11 is a perspective view of a torsion assembly of FIG. 6.

Torsion shaft 36 can be a single one-piece shaft that extends from one torsion assembly 24 through a wishbone connecting arm 60 into the other torsion assembly 24, as shown in FIG. 5. Torsion shaft 36 is fixed to wishbone connecting arm 60 by welding, swaging, expansion or any other appropriate methods. Wishbone connecting arm 60 can be formed from sheet metal and have a cover 62 fixed thereto. A wheel spindle 40 is connected to an outer end of wishbone connecting arm 60. The wheel spindle 40 can be connected by a pivotal connection 42, therefore having a pivot axis at the pivotal connection 42. A wheel and tire 20 are rotatably attached to wheel spindle 40. Appropriate wheel bearings and brake mechanisms (not shown) are also attached to the wheel spindle 40 and wheel and tire 20, as needed. The wheel spindle 40 has an axis that extends at a 90° angle to the axis of the torsion shaft 36. In a preferred embodiment, as can be seen in FIGS. 2, 3, and 10, the wheel spindle 40 axis intersects wheel spindle 40 pivot axis. Wishbone connecting arm 60 can be asymmetric as shown in FIG. 1, or symmetric as shown in FIG. 6. When used in an asymmetric configuration, wishbone connecting arm 60 can position the wheel spindle 40 towards the front or leading edge, as shown in FIG. 1, or towards the rear or trailing edge. In addition to the wishbone shape shown in the FIGS. 1, the wishbone connecting arm 60 could be a straight connecting arm, have an L-shape or an H-shape.

In an alternate embodiment, torsion shaft 36 can be formed in two sections 36a, as shown in FIG. 6. One torsion shaft section 36a extends into one torsion assembly 24 and is attached to a first side of wishbone connecting arm 60 and the other torsion shaft section 36a extends into the other torsion assembly 24 and is attached to a second side of wishbone connecting arm 60.

An adjustable length camber caster adjusting rod 46 is connected to a torsion assembly 24 and the wheel spindle 40. Because most of the loads on the wheel spindle 40 occur during normal forward motion, the adjusting rod 46 is norm ally placed on the forward side of the torsion axle 10, as shown in the FIGS. The adjusting rod 46 is connected to a torsion assembly 24 by pivotal connection 48 and is connected to the wheel spindle 40 by a second pivotal connection 50. In one embodiment, the adjusting rod 46 has a threaded fitting (not numbered) at its outer end. The length of the adjusting rod 46 is adjusted by turning the threaded fitting to lengthen or shorten the adjusting rod 46 prior to attaching the adjusting rod 46 to the spindle pivotal connection 50. In another embodiment, adjusting rod 46 has a right had threaded bore (not numbered) on one end and a left hand threaded bore (not numbered) one the other end, see FIG. 3. Threaded fittings 47 engage the threaded bores and pivotally attach the adjusting rod 46 to the torsion assembly 24 and the wheel spindle 40. Rotation of adjusting rod 46 with lengthen or shorten adjusting rod 46. Adjusting rod 46 is normally used to adjust the camber and caster of torsion axle 10. Preferably, adjusting rod 46 is pivotally connected to the wheel spindle 40 at a point that is vertically offset from the axis of pivot of wheel spindle 40. Adjusting rod 46 also acts as a brace or balancer to increase the stiffness or strength of torsion axle 10. The strengthening effect of adjusting rod 46 can be increased by moving pivotal connection 48 away from wishbone connecting arm 60 that adjusting arm 60 extends at an angle from torsion assembly 24 to wheel spindle 40. The strength of the components of torsion axle 10 can be designed such that the wheel spindle 40 is the weak component in the torsion axle 10. Thereby, if the torsion axle 10 is overloaded or overstressed, the wheel spindle 40 will fall prior to the other components falling. Wheel spindle 40 can be replaced by removing the wheel spindle pivotal connection 42, removing the broken wheel spindle 40 and replacing the pivotal connection 42. In prior art transverse torsion axles, the entire axle assembly had to be removed and replaced to repair a broken wheel spindle. Adjusting rod 46 can be positioned either below the torsion assembly 24, as shown in FIGS. 1–5, 7, 8, and 10, or above the torsion assembly 24, as shown in FIGS. 6 and 9.

The toe-in toe-out of torsion axle 10 can be adjusted in several ways. The offset of one housing 30 from the trailer can be greater than the offset of the other housing 30 from the trailer. The wishbone connecting arm 60 can be formed with the desired offset. Finally, spacers (not shown) can be placed between one or the other housing 30 and the trailer.

Figure 7:
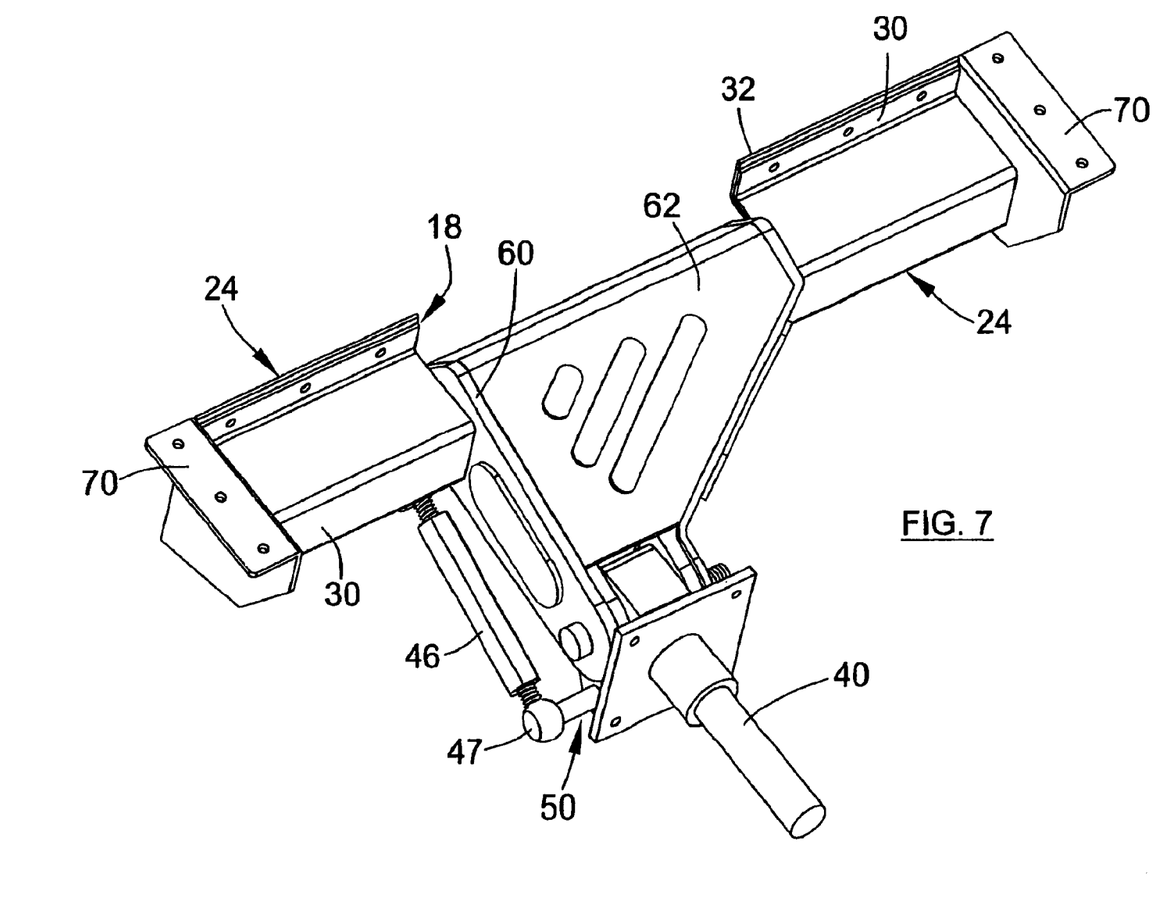
FIG. 7 is a perspective view of a third embodiment of a torsion axle according to the present invention having floor mounting flanges.
Figure 8:
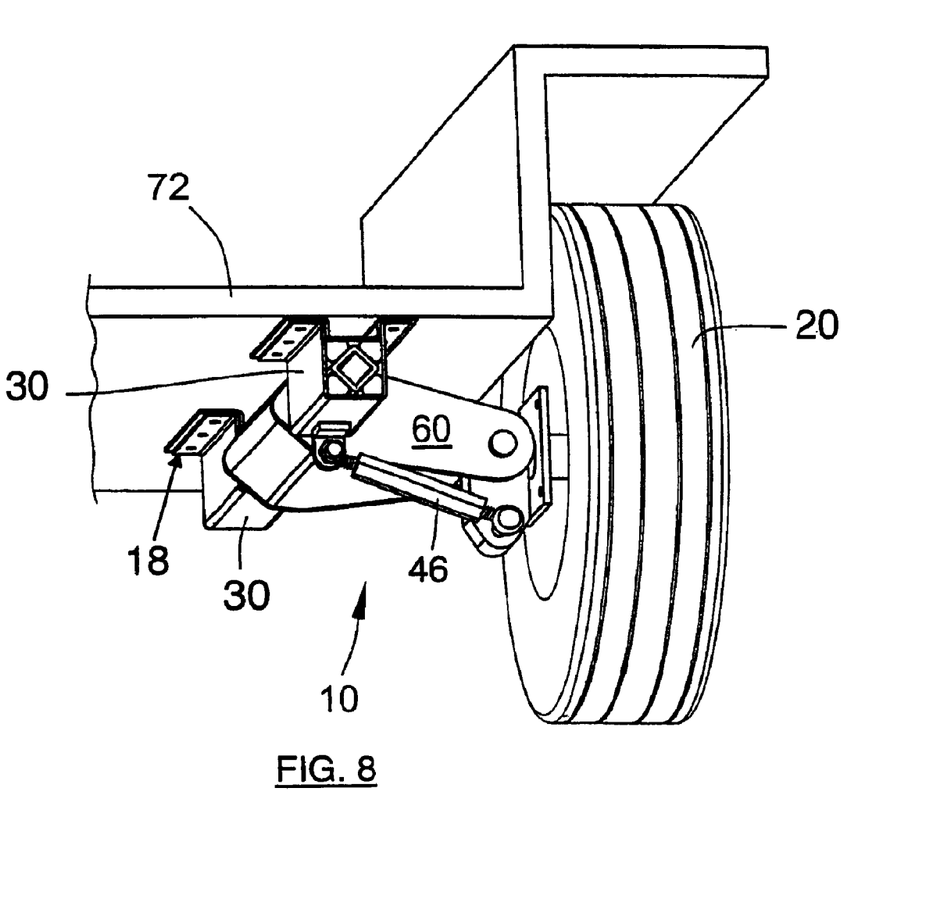
FIG. 8 is a perspective view of a fourth embodiment of a torsion axle, shown attached to a floor of a trailer.

Normally, torsion axle 10 is attached to the trailer frame (not shown). Alternate embodiments of torsion axle 10 are shown in FIGS. 7 through 8 where the torsion axle 10 is attachable or attached directly to the trailer floor 72 or trailer side. In one embodiment FIG. 7, floor mounting flanges 70 are attached to the torsion assemblies 24. The torsion axle 10 is then attached to the trailer floor 72 using a plurality of threaded fasteners and washers (not shown). In another embodiment, shown in FIG. 8, the torsion assemblies 24 are turned 90° such that mounting flanges 18 are oriented upwards for fastening to the bottom surface of the trailer floor 72. The torsion aide axles 10 shown in FIGS 1–7 can be fastened to either a side of the trailer or to a portion of the trailer frame.

Figure 9:
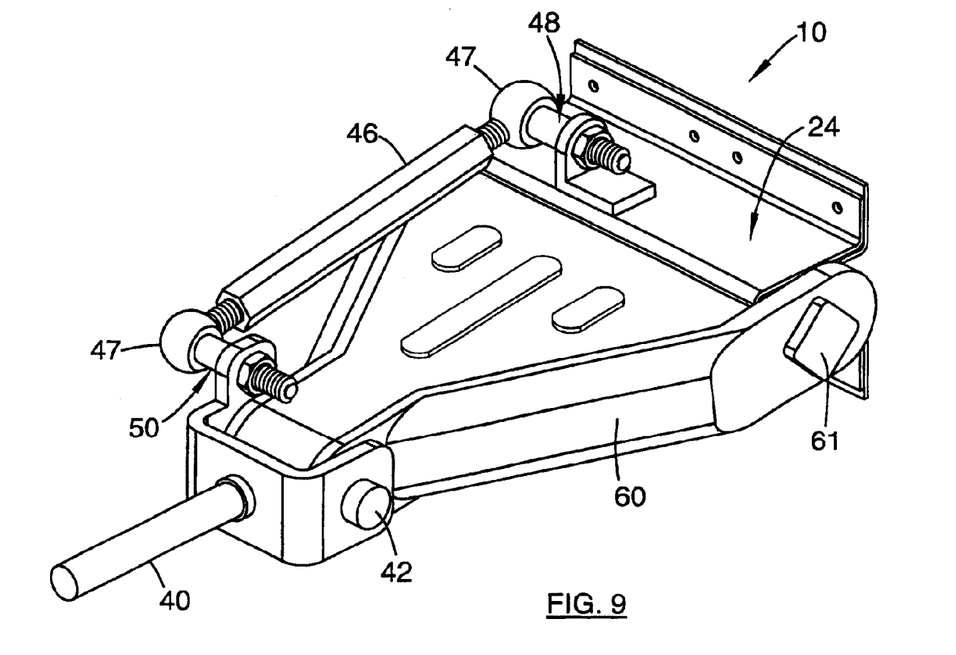
FIG. 9 is a perspective view of a fifth embodiment of a torsion axle having a single torsion assembly.

In addition to having two torsion assemblies 24, torsion axle 10 can be arranged to use a single torsion assembly 24, as shown in FIG. 9. A single torsion assembly 24 is positioned in the middle of wishbone connecting arm 60 between two torsion shaft extensions 61 (only the right hand shaft extension being shown in FIG. 9). Torsion shaft 36 is fixed to both shaft extensions 61 and extends from one shaft extension 61, through torsion assembly 24, and to the other shaft extension 61.

What is claimed is:

1. A torsion axle comprising:

a shaft;

at least one torsion assembly, the shaft extending into and being supported by the at least one torsion assembly;

a connecting arm being fixed to the shaft; and a wheel spindle pivotally connected to an end of the connecting arm distal to the shaft, the wheel spindle having an axis 90° to the axis of the shaft, the wheel spindle having a pivot axis at the pivotal connection to the connecting arm, wherein the wheel spindle pivot axis intersects the wheel spindle axis; and the wheel spindle pivot axis is substantially parallel to the axis of the shaft.

2. The torsion axle according to claim 1, wherein the at least one torsion assembly comprises:

a housing adapted to be attached to a vehicle; and a plurality of resilient rods within the housing, the shaft being positioned within the housing, the resilient rods being spaced about an outer periphery of the shift, the resilient rods extending parallel to the shaft.

3. The torsion axle according to claim 2, wherein the shaft is configured to engage the resilient rods whereby the resilient rods resist rotation of the shaft.

4. The torsion axle according to claim 1, wherein the shaft is tubular.

5. The torsion axle according to claim 1, wherein the shaft has a non-cylindrical shape.

6. The torsion axle according to claim 1, wherein the number of torsion assemblies is two, the torsion assemblies being spaced apart, the connecting arm being positioned between the torsion assemblies.

7. The torsion axle according to claim 6, wherein the shaft is comprised of two shaft sections, one shaft section being fixed to a first side of the connecting arm and extending into and being supported by one torsion assembly, the other shaft section being fixed to a second side of the connecting arm and extending into and being supported by the other torsion assembly.

8. The torsion axle according to claim 1, further comprising:
an adjustable length camber caster adjusting arm having a first end attached to a torsion assembly and a second end attached to the wheel spindle.

9. The torsion axle according to claim 8, wherein the adjustable length camber caster adjusting arm is pivotally attached to the torsion assembly.

10. The torsion axle according to claim 9, wherein the adjustable length camber caster adjusting arm is pivotally attached to the wheel spindle.

11. The torsion axle according to claim 8, wherein the second end of the adjustable length camber caster adjusting arm is vertically offset from the wheel spindle pivot axis.

12. The torsion axle according to claim 1, wherein the number of torsion assemblies is one, one end of the shaft being fixed to a first side of the connecting arm, extending into and through the torsion assembly, and having its other end fixed to a second side of the connecting arm.

13. The torsion axle according to claim 1, wherein the connecting arm has a wishbone shape.

14. A torsion axle comprising:
a shaft;
two spaced apart torsion assemblies, the shaft extending into and being supported by the torsion assemblies, each torsion assembly having: a housing adapted to be attached to a vehicle; and a plurality of resilient rods within the housing, the resilient rods being spaced about an outer periphery of the shaft, the resilient rods extending co-linearly with the shaft, the shaft being configured to engage the resilient rods, whereby the resilient rods resist rotation of the shaft;
a wishbone connecting arm positioned between the torsion assemblies and being fixed to the shaft; and
a wheel spindle pivotally connected to an end of the wishbone connecting arm distal the shaft, the wheel spindle having an axis 90° to the axis of the shaft,
wherein the resilience of the resilient rods in one torsion assembly is different than the resilience of the resilient rods in the other torsion assembly.

15. A torsion axle for use with a trailer, the trailer having a longitudinal dimension extending from front to back and a transverse dimension extending from side to side, the torsion axle comprising:
a longitudinally extending torsion shaft;
at least one torsion assembly, the torsion shaft extending into and being supported by the at least one torsion assembly, the torsion assembly comprising: a housing adapted to be attached to the vehicle; and a plurality of longitudinally extending resilient rods within the housing, the resilient rods being spaced about an outer periphery of the torsion shaft, the torsion shaft being configured to engage the resilient rods whereby the resilient rods resist rotation of the torsion shaft;
a connecting arm being fixed to the shaft;
a wheel spindle pivotally connected to an end of the connecting arm distal to the shaft, the wheel spindle having an axis 90° to the axis of the shaft, the wheel spindle having a pivot axis at the pivotal connection to the connecting arm, wherein the wheel spindle pivot axis intersects the wheel spindle axis and the wheel spindle pivot axis is substantially parallel to the axis of the shaft,
wherein the trailer includes a floor and a plurality of sides, the torsion assembly housing being attached to one of the trailer floor and a trailer side.

16. The torsion axle according to claim 15, wherein the number of torsion assemblies is two, the torsion assemblies being spaced apart, and wherein the connecting arm is wishbone shaped, the wishbone shaped connecting arm being positioned between the torsion assemblies.

17. The torsion axle according to claim 15, further comprising:
an adjustable length camber caster adjusting arm having a first end pivotally attached to a torsion assembly and a second end pivotally attached to the wheel spindle.

18. In a trailer having a floor and a side, the trailer having a longitudinal dimension extending from front to back and a transverse dimension extending from side to side, the improvement comprising:
a torsion axle comprising:
two spaced apart torsion assemblies, each torsion assembly having a longitudinally-extending shaft, an elastomeric bushing about the shaft, and housing about the elastomeric bushing, the housing having at least one flange extending therefrom;
a connecting arm positioned between torsion assemblies, the shafts being fixed to the connecting arm; and
a wheel spindle pivotally connected to an end of the connecting arm distal to the torsion shafts, the wheel spindle having an axis, and a pivot axis relative to the connection to the connecting arm, the wheel spindle axis intersecting the wheel spindle pivot axis, the wheel spindle pivot axis being parallel to the axis the shafts,
wherein each torsion axle housing is selectively attached to one of the trailer floor and the trailer side.

* * * * *